May 13, 1958    W. F. TRAUGOTT    2,834,387
CORN CRACKER
Filed April 8, 1954    2 Sheets-Sheet 1
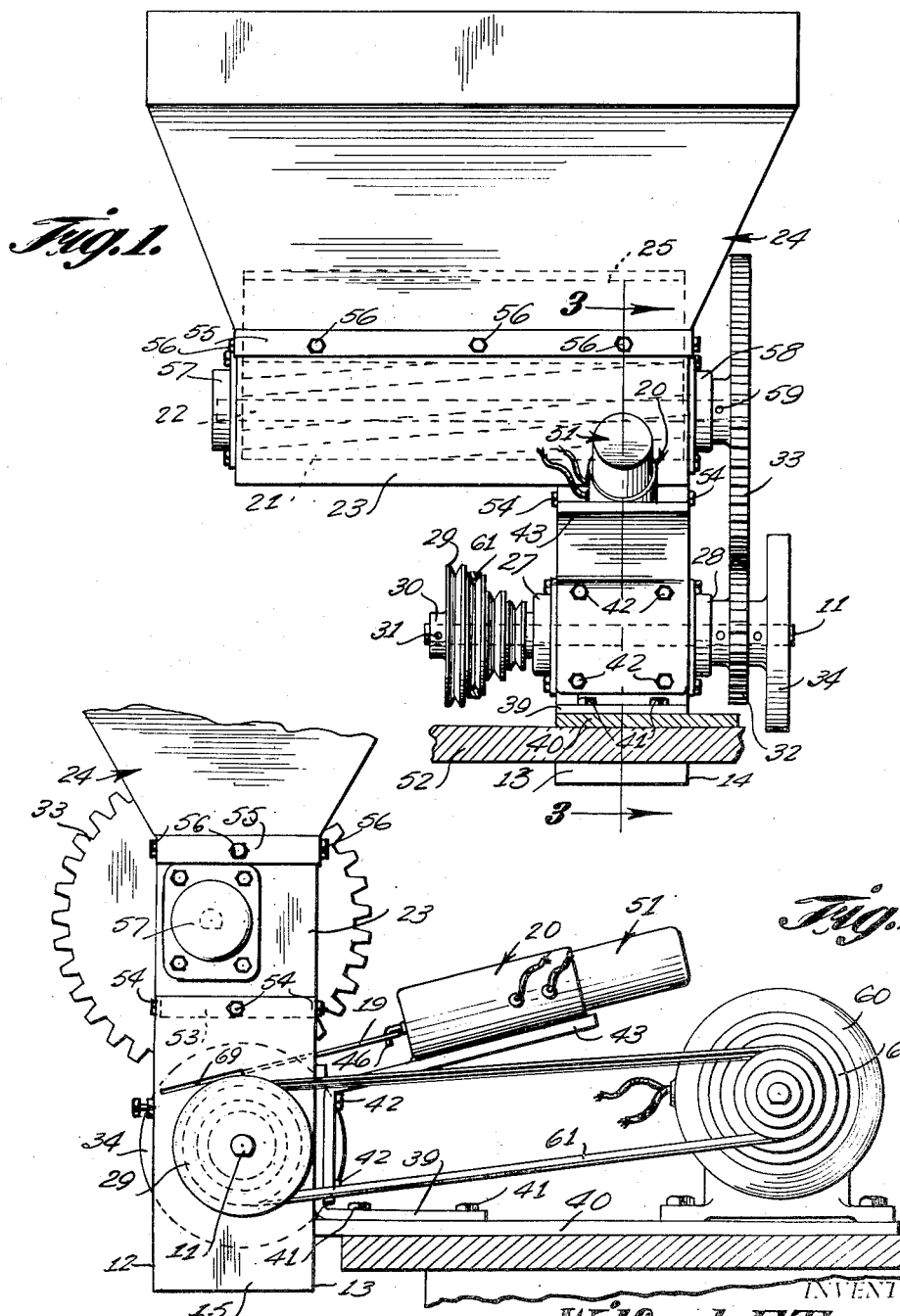

May 13, 1958  W. F. TRAUGOTT  2,834,387
CORN CRACKER
Filed April 8, 1954  2 Sheets-Sheet 2

INVENTOR.
Wilfred F. Traugott
BY Victor J. Evans & Co.
ATTORNEYS

United States Patent Office 2,834,387
Patented May 13, 1958

2,834,387
CORN CRACKER

Wilfred F. Traugott, West Point, Va.

Application April 8, 1954, Serial No. 421,776

1 Claim. (Cl. 146—79)

This invention relates to farm implements and equipment, particularly of the type used for reducing corn and other grain to meal or powder, and in particular a hopper having a fast rotating cutting or chopping element, such as the cutter of a milling machine, mounted in a housing or spout extended therefrom and positioned to coact with spaced horizontally disposed stationary cutting blades adjustably mounted on one side of the housing whereby grain fed from the hopper to the cutting element is cut, sliced or chopped to provide a meal or powder.

The invention also includes a cutter or chopping element positioned above the hopper and milling cutter whereby ears of corn fed to the machine are first chopped into comparatively small particles and these particles are sliced or cut by the milling cutter whereby both the kernels and corn cobs are reduced to meal or powder.

The purpose of this machine is to provide means for reducing grain, such as kernels of corn, complete ears of corn, wheat, rye and the like, to a product suitable for stock feed whereby the feed may be prepared from the grain daily or as it is used.

In substantially all stock feed, and particularly where kernels and cobs of corn are crushed or ground to a product suitable for feed, the food value reduces from day to day after the products are ground or crushed and, with this thought in mind, this invention contemplates a machine adapted for individual use whereby grain may be cut to provide a palatable stock feed as use of the feed is required.

The object of this invention is, therefore, to provide means for forming a grain cutting or chopping machine whereby grain, and particularly kernels of corn and corn cobs are reduced to a feed for stock without crushing or grinding.

It has been found that to prepare corn cobs for stock feed it is necessary to chop up the kernels of corn with the cobs without mashing the material of the cob and for this reason it is another object of this invention to provide a machine that cuts kernels of grain and the like without mashing or otherwise compacting the body of particles of the grain.

A further object of the invention is to provide a grain cracking or cutting machine for reducing grain to a palatable feed for stock in which the machine is of a simple and economical construction.

With these and other objects and advantages in view the invention embodies a vertically disposed housing having a rotary cutting head including peripherally spaced longitudinally disposed cutting blades coacting with the plurality of vertically spaced cutting knives, a hopper for feeding materials to the cutting head and knives, a gate for regulating the materials fed to the parts and a superimposed hopper also having a cutting head therein and adapted to cut ears of corn including kernels and cobs to particles adapted to be supplied to the cutting head and knives below.

Other features and advantages of the invention will appear from the following description taken in connection with the drawings, wherein:

Figure 1 is a front elevational view showing the corn cracker with the rotary cutter for chopping ears of corn in a super-imposed position on the corn cracker.

Figure 2 is a side elevational view illustrating the motor for operating the rotary parts of the device and also showing a solenoid for actuating a gate positioned above the milling cutter head.

Figure 3:
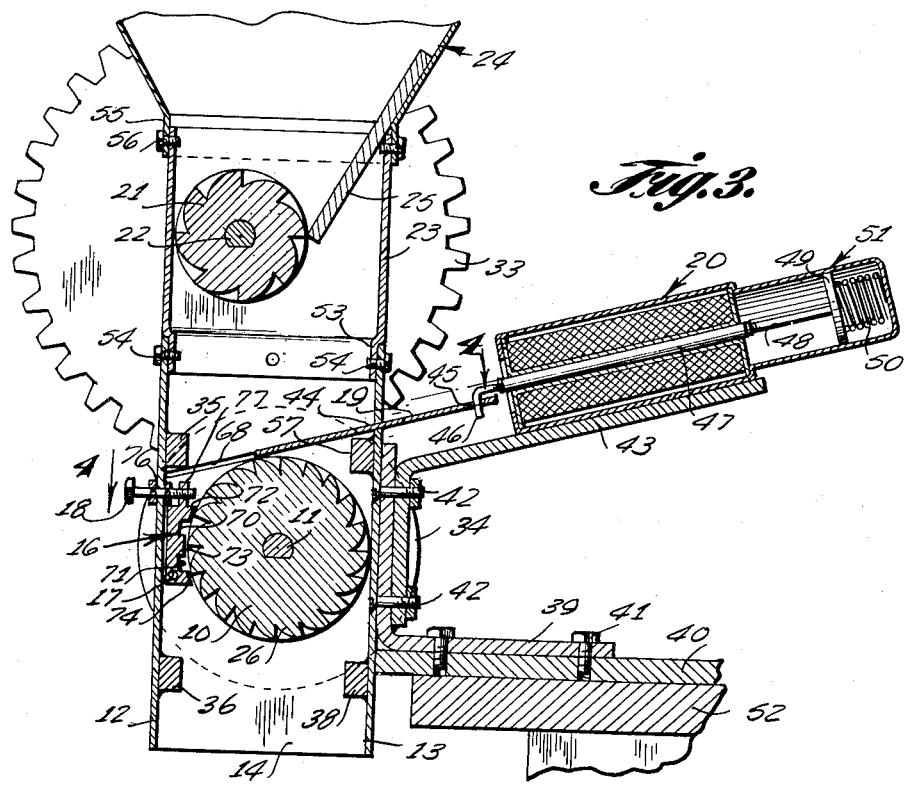
Figure 3 is a vertical section through the improved corn cracker taken on line 3—3 of Figure 1 showing the device with the parts in operating positions.
Figure 4:
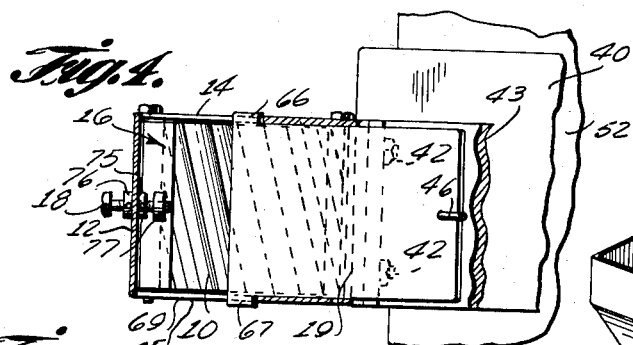
Figure 4 is a sectional plan taken on line 4—4 of Figure 3 showing the feed control gate which is operated by the solenoid.
Figure 5:
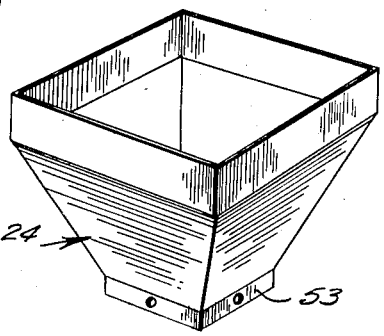
Figure 5 is a detail illustrating a hopper adapted to be positioned above the corn chopper.
Figure 6:
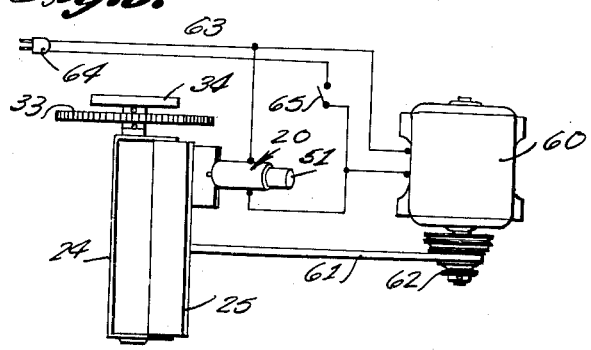
Figure 6 is a plan view with the parts on a reduced scale illustrating the relative positions of the parts and showing a typical wiring diagram.

Referring now to the drawings wherein like reference characters denote corresponding parts, the improved corn chopper of this invention includes a milling cutter head 10 mounted on a shaft 11 and positioned in a housing, rectangular-shaped in cross-section, having side walls 12 and 13 and end walls 14 and 15, a cutter blade carrying block 16 pivotally mounted in the housing with a pin 17 and adapted to be adjusted by an adjusting screw 18, a gate 19 slidably mounted in the housing and adapted to be actuated by a solenoid 20 and a rotary cutter 21 mounted on a shaft 22 in an upper section 23 of the housing and positioned in the throat or lower portion of a hopper 24 in the lower part of which is a baffle 25.

The milling cutter head 10 is provided with peripherally spaced longitudinally positioned cutting blades 26 and a shaft 11 upon which the cutter head 10 is mounted is rotatably mounted in bearings 27 and 28 on the end walls 14 and 15, respectively, of the housing with the ends of the shaft extended whereby a cone pulley 29 having a hub 30 is secured on one end of the shaft with a key or pin 31 and a gear 32 on the opposite end of the shaft is positioned to mesh with a gear 33 on the shaft 22 of the rotary cutter 21. The shaft 11 is also provided with a fly wheel 34 that may be of any suitable size.

In the design, particularly as shown in Figure 3 a side wall 12 of the housing is provided with cross bars 35 and 36 and similar bars, as indicated by the numerals 37 and 38 are provided on the inner surface of the wall 13.

Also, in the design shown in Figure 3, the side wall 13 is provided with a clip angle 39 that is secured to a base plate 40 with bolts 41 and to the side wall 13 with bolts 42 by which a bracket 43 on which the solenoid 20 is mounted is also secured to the housing.

The upper part of the side wall 13 is provided with a slot 44 through which the gate 19 extends and the extended end of the gate is provided with an eye 45 through which a hook 46 extends, the hook being positioned on the end of a core 47 of the solenoid 20 whereby the position of the gate 19 may be controlled by the solenoid. The opposite end of the core 47 is provided with a stem 48 having a disk 49 on the extended end and the disk 49 is positioned to be engaged by a spring 50 in a spring housing 51 carried by the extended end of the solenoid housing. The base plate 40 may be mounted on a stand or table, as indicated by the numeral 52; however, it will be understood that the corn cracker may be provided with any suitable mounting means.

The rotary cutter 21 is adapted to receive ears of corn and, as illustrated in Figures 1 and 3, the housing 23 in which the cutter 21 is mounted is elongated providing a section extended from the upper end of the housing in which the milling cutter head is positioned. It will be understood that the housing 23 may be located in any suitable position on the housing of the milling cutter head; however, in the design shown the housing 23 is provided with a flange 53 that extends into the upper end of the lower housing in which the flange 53 is secured with bolts 54. The lower part of a hopper 24 is also provided with a flange, such as the flange 55 and the flange 55 is secured to the upper end of the section 23 of the hopper with bolts 56.

The shaft 22 of the rotary cutter 21 is journaled in bearings 57 and 58 at the ends of the housing 23 and a gear 33 is secured on the extended end of the shaft with a key or pin 59.

With the parts assembled as shown and described the milling cutter head of the corn chopper is driven by a motor 60 through a belt 61 trained over a section of the cone pulley 29 and also over a section of a similar cone pulley 62 on the motor 60 and the rotary cutter 21 is rotated by means of the meshing gears 32 and 33, the gear 32 being fixedly mounted on the shaft 11 of the milling cutter head and the gear 33 being fixedly mounted on the shaft 22 of the rotary cutter.

The motor and solenoid may be supplied with electric current by means of a cord 63, one end of which is provided with a plug 64 and the opposite end being connected to the solenoid 20 and motor 60. A switch 65 is provided in the cord for starting and stopping the machine.

In the design shown a gate 19 is provided with lugs 66 and 67 that extend through slots 68 and 69, respectively, in the end walls 14 and 15 and with the gate mounted in this manner the position thereof is readily controlled by the solenoid.

In the design shown the cutting blade block 16, which is pivotally mounted in the housing with a pin 17 is provided with spaced grooves 70 and 71 which divide the block into a plurality of cutting blades, as indicated by the numerals 72, 73 and 74, and with these blades positioned to coact with the cutting blades of the cutter head 10 the parts are sliced or cut instead of being crushed or mashed, as in a crusher or grinder.

The positions of the cutting blades are controlled by the adjusting screw 18 which extends through collars 75 and 76 on opposite sides of the side wall 12 and the inner end of the screw is threaded through a lug 77 extended upwardly from the block 16. It will be understood that other suitable adjusting means may be provided for the cutting blades and any suitable number of blades may be used.

With the parts assembled in this manner the lower part of the device may be used independently whereby grain deposited above the milling cutter head 10 will be cut into meal or the like and when it is desired to prepare both kernels and cobs of corn the upper rotary cutter 21 and hopper 24 are used.

What is claimed is:

In a corn cracker, the combination which comprises a vertically disposed housing, rectangular-shaped in cross section having side and end walls, an L-shaped bracket positioned on one side of the housing for mounting the housing, a hopper extended from the upper end of the housing, a longitudinally disposed shaft extended through the housing and rotatably mounted in the end walls thereof, a milling cutter mounted on the shaft, a block having vertically spaced horizontally disposed cutting blades on the face thereof positioned between the milling cutter head and a side wall of the housing, means for pivotally mounting the lower edge of the block on the side wall of the housing, a screw threaded in the upper part of the block and rotatably mounted in said side wall for adjusting the position of the blades on the face of the block in relation to cutting blades of the cutter head, an L-shaped bracket having a leg secured to the side wall of the housing opposite to the side wall upon which the block is positioned and having an arm extended upwardly from the upper end thereof, a solenoid carried by said arm, a gate slidably mounted in an inclined position in the housing and extended over the milling cutter head, means for operatively connecting the gate to the solenoid whereby the position of the gate is controlled by the solenoid, a rotary cutter rotatably mounted in the end walls of the housing and positioned above the milling cutter head, a baffle extended from the hopper to a point adjacent the rotary cutter for guiding corn to the cutter, meshing gears carried by the rotary cutter and shaft of the milling cutter head for rotating the rotary cutter by the milling cutter shaft, and means for rotating the shaft of the milling cutter head.

References Cited in the file of this patent
UNITED STATES PATENTS

| Re. 180 | Bantz et al. | Oct. 15, 1850 |
| 12,977 | Wilson | May 29, 1855 |
| 182,054 | Baumann | Sept. 12, 1876 |
| 381,515 | Winchell | Apr. 17, 1888 |
| 408,448 | Winchell | Aug. 6, 1889 |
| 465,667 | Janney | Dec. 22, 1891 |
| 751,488 | Engel | Feb. 6, 1904 |
| 1,298,289 | Byrd | Mar. 25, 1919 |
| 2,334,181 | Elston | Nov. 16, 1943 |
| 2,472,725 | Rundle | June 7, 1949 |